United States Patent [19]
Schurter et al.

[11] Patent Number: 6,099,440
[45] Date of Patent: Aug. 8, 2000

[54] PROGRESSIVE RESISTANCE SYSTEM

[76] Inventors: Charles Schurter; Brad Stoffers, both of 1801 E. Newport Cir., Santa Ana, Calif. 92705

[21] Appl. No.: 09/076,674

[22] Filed: May 12, 1998

[51] Int. Cl.[7] ..................................................... A63B 22/06
[52] U.S. Cl. ................................................................ 482/63
[58] Field of Search ........................... 482/51, 57, 63, 482/64, 65, 110; 188/73.37, 73.5

[56] References Cited

U.S. PATENT DOCUMENTS

| | | |
|---|---|---|
| Re. 34,478 | 12/1993 | Dalebout . |
| 1,656,472 | 1/1928 | Christofferson . |
| 3,719,104 | 3/1973 | Dian . |
| 3,870,127 | 3/1975 | Wilson et al. ............................ 188/24 |
| 4,235,314 | 11/1980 | Reagan .................................. 188/73.5 |
| 4,323,237 | 4/1982 | Jungerwirth ............................ 482/110 |
| 4,660,685 | 4/1987 | Thacker et al. ...................... 188/73.37 |
| 4,749,182 | 6/1988 | Duggan . |
| 5,193,833 | 3/1993 | Reisinger . |
| 5,351,974 | 10/1994 | Cech . |
| 5,542,507 | 8/1996 | Warchocki . |
| 5,626,209 | 5/1997 | Viola . |
| 5,632,708 | 5/1997 | Wilkinson . |

*Primary Examiner*—Stephen R. Crow
*Attorney, Agent, or Firm*—Owen J. Bates

[57] ABSTRACT

The present invention relates to a two stage resistance system which causes resistance to a moving surface to be exerted in two separate phases. More particularly, the two stage resistance system may be adapted to exercise equipment for the purpose of providing a wide range of resistance forces that must be overcome by the user. This provides the user with a more useful and adaptable means of configuring an exercise routine.

14 Claims, 4 Drawing Sheets

PROGRESSIVE RESISTANCE SYSTEM

BACKGROUND OF THE INVENTION

The present invention relates to a progressive resistance system most commonly provided for a piece of exercise equipment. More particularly, the present invention relates to a means for generating in two stages, a resistance to an applied force. The first stage provides for a generally linear increase in resistance over the majority of the effective operational range of the invention. The second stage provides for resistance in a rapidly increasing fashion which comes to play in the later portions of the effective range of the invention.

By way of background, many systems have been devised for applying resistance to an applied force. The following United States patents describe systems exemplary of these prior art approaches:

| | | |
|---|---|---|
| 4,323,237 | Adaptive Exercise Apparatus | Jungerwirth |
| 4,749,182 | Variable Resistance Aerobic Exercise Machine | Duggan |
| 5,351,974 | In-Line Skate Braking Assembly | Cech |
| 5,193,833 | Bicycle Front Suspension, Steering & Braking System | Reisinger |

Because of the ever increasing interest in health and fitness, there have been a number of devices that have been built in order to facilitate exercise. These devices have taken on a variety of modes and configurations. One of the key design elements that must be addressed by these devices is how to present to the users, a range of resistance to the particular exercise being undertaken. Users present themselves with a range of strength and conditioning and thus require a range of resistances. Even with the same person, the level of resistance that the user desires will change over the course of a workout period. Initially, the user may want slight resistant as the user warms up and then may want to increase resistance during the main part of the workout and then finally may want to decrease resistance during an exercise-to-fatigue phase or may simply want a slight amount of resistance during a cool-down phase.

Various means have been used to impart varying resistance. One form is the use of standard center-pull caliper brakes which typically impart force along the two outside edges of a flywheel which is being rotated in some manner by the efforts of a user. These devices have only a single stage of resistance and are often hard to adjust in a reproducible manner.

There has been computerized exercise equipment in which resistance is generated by the application of a brake pad against a brake disk. The force applied to the brake pad against the brake disk is generated by a pressurized hydraulic cylinder or other like device under computer control so that the amount of resistance experience by the user is varied based upon measured parameters, such as heart rate, respiration rate, number of repetitions per time, etc.

These devices are complex requiring an electrical power source, either from a utility outlet or from a generator driven by the user. They also typically require a hydraulic pump and pressurized fluid lines. All of these components increase the cost, weight and complexity of the device.

Another type of resistance device seen in exercise equipment is used in association with inline skates. Inline skating provides a relatively inexpensive and fun form of exercise and has become quite popular. Along with general enhancements of the inline skates, braking devices have also been developed.

A braking pad is forced against the periphery of one of the inline skate wheels which has been fitted with a special friction surface. The pad is mounted on a pivoting lever. When one end of the lever is moved away from the wheel, the other end is forced closer to the wheel, urging the brake pad tighter against the special surface on the wheel, bring the skate and hopefully the user, to a safe stop.

The lever is actuated by a cable mechanism in which one end of the cable is attached to the one end of the lever and the cable housing is fixed in placed by attachment to the frame of the skate. The other end of the cable is terminated in an actuating device which is held in the hand of the user. When the user wishes to stop, he engages the actuator which causes the cable to be pulled though the housing and pulling the one end of the lever up, the other end of the lever then forcing the pad against the wheel and stopping the user.

Though this is a braking device, its primary purpose is to bring the rotation of the wheel to smooth but definite stop. The user of an exercise machine not only needs to hold the resistance at a reproducible and steady level but also to be able to change it easily to another reproducible setting.

None of the current devices for imparting resistance provide a means creating resistance in two or more stages and in a manner that is convenient for the user.

SUMMARY OF THE INVENTION

The present invention provides a mechanism of imparting resistance in two stages. The first stage provides a gradual, generally liner increase in resistance over a large portion the actuation range of the device. The second stage comes into effect during the latter portions of the actuation range of the invention. During the second stage, the level of resistance becomes much larger and resistance increases in a much more rapid rate in relation to the amount of cable actuation.

The two stage feature provides the user with several key benefits. When the user has adjusted the invention in the stage one range, the user can set the invention to provide a useable but a generally moderate level of resistance. At the choice of the user, the invention can be adjusted to operate in the stage two range. In stage two, the level of resistance becomes much greater, much quicker, providing for the experienced and conditioned user, a workout level consistent with that user's needs.

The two stages are generated by use of resistance material which is attached to a compressible foam pad and additionally secured in place by use of an adhesive and a rivet holding the resistance material to a mounting bracket. The foam pad and resistance material is biased against a flywheel or other moving surface, thus requiring that an increase in force be applied by the user to keep the flywheel or moving surface operating at the same speed.

During stage one, the foam pad compresses as greater force is applied. Therefore, during this range of compressibility, the increase in resistance level experienced by the user is gradual. Once the foam pad is fully compressed, additional force on the foam pad and the resistance material, is completely transferred to an increase in force of the resistance material against the flywheel. Thus the level of resistance applied to the moving surface increases at a higher rate.

This type of response is particularly desired by the experienced and well-conditioned user who requires a wide range of resistances with a convenient means for selecting those resistances.

These main objects, features and advantages of the invention will be readily apparent to those skilled in this art from the following description of certain preferred embodiments thereof, taken in conjunction with the accompanying drawings, although variations and modifications may be effected without departing from the spirit and scope of the novel concepts of the invention.

DESCRIPTION OF THE DRAWINGS

The invention will be further described in connection with the accompanying drawings, in which.

DETAILED DESCRIPTION OF THE PREFERRED EMBODIMENT

Figure 1:
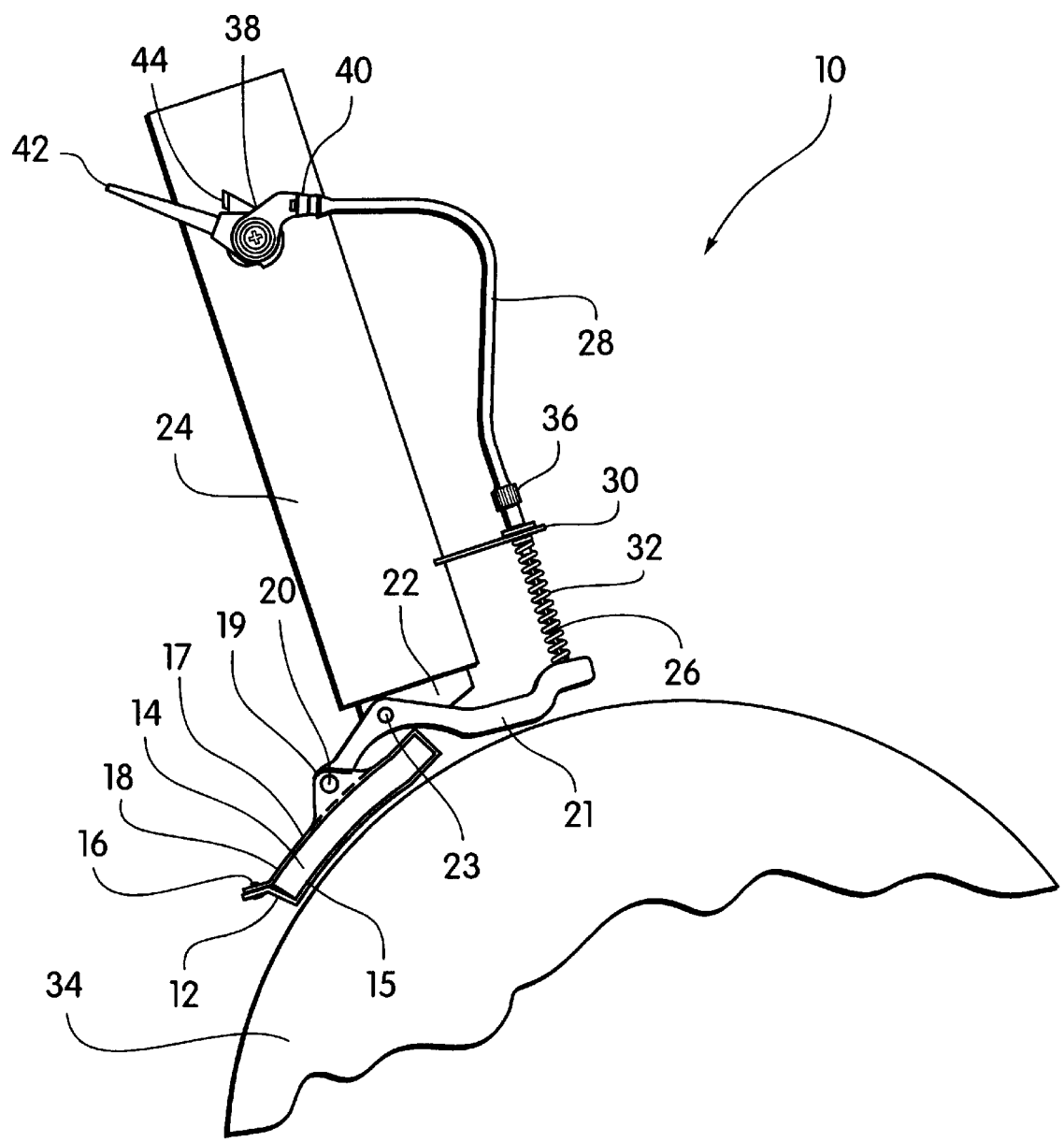
FIG. 1 is side elevation view of an exercise bike flywheel progressive resistance system constructed in accordance with the principles of the present invention.

A preferred construction of the Progressive Resistance System 10 is shown in FIG. 1. Resistance Material 12 is attached to a rectangular shaped Foam Pad 14. Resistance Material 12 is held in place by Adhesive Layer 15 positioned between Resistance Material 12 and Foam Pad 14 and further held in place by Rivet 16 which passes through one end of Resistance Material 12 and holding it securely to Pad Mounting Bracket 17.

Foam Pad 14 is held in place by Resistance Material 12 and Adhesive Layer 18 positioned between Foam Pad 14 and Pad Mounting Bracket 17. Pad Mounting Bracket 17 has two upwardly projecting Wings 19, one on each side of Pad Mounting Bracket 17. Wings 19 each have a mounting hole sized to receive Pivot Pin 20. Pad Mounting Bracket 17 is pivotally attached to the first end of Fulcrum Lever 21 with rotation being about Pivot Pin 20. The first end of Fulcrum Lever 21 has a hole sized to receive Pivot Pin 20. The first end of Fulcrum Lever 21 is positioned between Wings 19 and pivotally attached to Pad Mounting Bracket 17 by Pivot Pin 20 which is held in place by Wings 19.

Fulcrum Lever 21 is pivotally attached to Fulcrum Mounting Bracket 22 at a point about one third of the way from the first end of Fulcrum Lever 21 with rotation being about Pivot Pin 23. Fulcrum Mounting Bracket 22 is attached to Frame Tube 24 and provides a solid mechanical point of attachment for Fulcrum Lever 21.

The second end of Fulcrum Lever 21 is attached to the first end of Tension Cable 26, the cable being partially retained within Tension Cable Housing 28. One end of Tension Cable Housing 28 is rigidly attached to Frame Tube 24 by means of Cable Housing Mounting Bracket 30. Return Spring 32 is positioned over the first end of Tension Cable 26 and held in place by Cable Housing Mounting Bracket 30 and the second end of Fulcrum Lever 21. The length of Return Spring 32 is selected so that Return Spring 32 is always at least lightly compressed to bias the second end of Fulcrum Lever 21 away from the Cable Housing Mounting Bracket 30. Thus when the Progressive Resistance System 10 is completely inactivated, the slight compression of Return Spring 32 will always bias the Resistance Material 12 away from contact with the Flywheel 34.

The exact position of Resistance Material 12 in relation to Flywheel 34, in an inactivated position, is determined by the adjustment made to Cable Adjusting Barrel 36 located at the first end of Tension Cable Housing 28 just above the Cable Housing Mounting Bracket 30. Adjustment to Cable Adjusting Barrel 36 controls how much of Tension Cable 26 extends past Cable Housing Mounting Bracket 30. This in turn controls the location of the second end of Fulcrum Lever 21 and thus how close Resistance Material 12 comes in contact, if at all, with Flywheel 34.

The second end of Tension Cable Housing 28 is attached to Cable Actuator 38 by means of Cable Attachment Bracket 40. Cable Actuator 38 is shown attached to Frame Tube 24. However, Cable Actuator 38 can be mounted in any commercially standard manner, in any location, which gives the user reasonable access to Cable Actuator 38. Cable Attachment Bracket 40 will cause Tension Cable 38 to be withdrawn from Tension Cable Housing 28 when Cable Adjustment Lever 42 is actuated. When Cable Adjustment Lever 42 is actuated, the second end of Tension Cable 26 which is attached to Cable Attachment Bracket 40, is pulled through the Tension Cable Housing 28 and draws the second end of Fulcrum Lever 21 away from the Flywheel 34. This movement causes the Fulcrum Lever 21 to pivot about Pivot Pin 23 and pushes the first end of Fulcrum Lever 21 toward Flywheel 34 and causes the Resistance Material 12 to come into contact with Flywheel 34 with increasing force as the Cable Adjustment Lever 42 is further actuated.

Cable Actuator 38 is obtained from standard commercial sources and may be configured in several forms. In one form, Cable Adjustment Lever 42 can be rotated through a range of about 135 degrees. At one end of the rotation range, no force is exerted on Tension Cable 26 and in the other end of the rotation range, maximum force is exerted. The user moves Cable Adjustment Lever 42 in small increments to exert the desired amount of force on Resistance Material 12 against Flywheel 34. In the preferred embodiment of Cable Actuator 38, Cable Adjustment Lever 42 is adjustably retained by incorporating a detent mechanism within Cable Actuator 38 so that the Cable Adjustment Lever 42 can be placed in a series of defined and reproducible locations.

Figure 2:
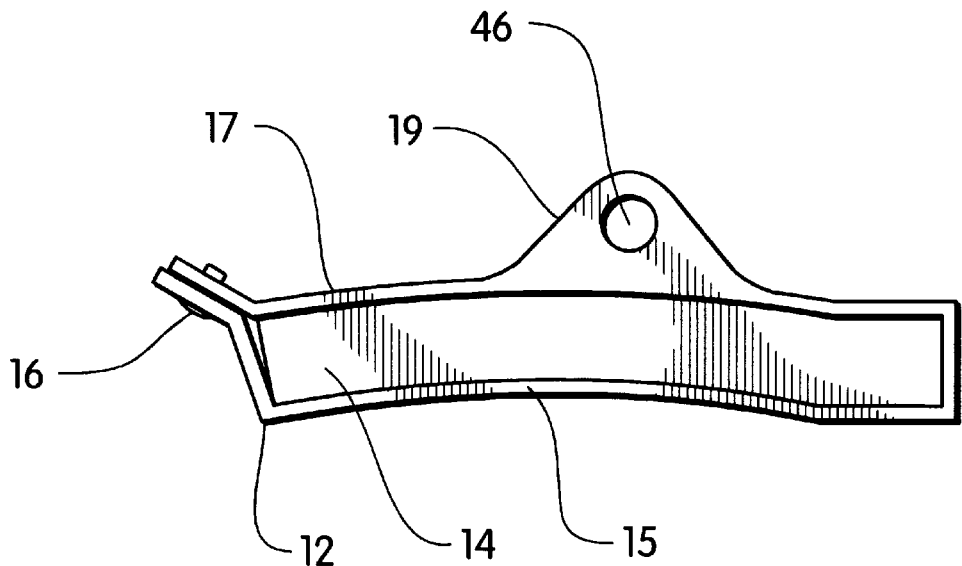
FIG. 2 is a side elevation view of a resistance pad assembly showing details of the pad mounting bracket, foam pad, and resistance material.

Now making reference to FIG. 2, details of the Pad Mounting Bracket 17 are shown. Resistance Material 12 is attached along the long axis of Foam Pad 14. Resistance Material 12 is made of sufficient length to attach to the whole length of Foam Pad 14 and extend enough beyond Foam Pad 14 that it may be attached by Rivet 16 to a portion of Pad Mounting Bracket 17. Adhesive Layers 15 and 18 also aid in securing Resistance Material 12 to Foam Pad 14 and Foam pad 14 to Mounting Bracket 17. One of Pivot Holes 46 is shown within one of Wings 19. Pivot Pin 20 first passes through one of the Pivot Holes 46, then through the Pad Mounting Hole 48, located in first end of Fulcrum Lever 21 and then passes through the other Pivot Hole 46, thus pivotally securing Fulcrum Lever 21 to Pad Mounting Bracket 17. Pivot Pin 20 may be held in place by using industry standard clips or pins.

Generally Pad Mounting Bracket 17 along with Foam Pad 14 and Resistance Material 12 are shaped to fit the curvature of Flywheel 34. However, the end of Pad Mounting Bracket 17 opposite Rivet 16 is less curved than the rest of Pad Mounting Bracket 17. When Progressive Resistance System 10 is fully actuated and maximal force is being exerted on Pad Mounting Bracket 17, Foam Pad 14 is becomes fully compressed. As result of this compression, Foam Pad 14 will expand and bulge out beyond Resistance Material 12. It is possible that Foam Pad 14 can be trapped between Flywheel 34 and Resistance Material 12 particularly when the user pedals backwards. This problem is solved by reducing the curvature of the one end of Pad Mounting Bracket 17, so that there is less compression of Foam Pad 14 at that end of Pad Mounting Bracket 17 and less extrusion of Foam Pad 14. This reduced compression and extrusion results in the reduction or elimination of damage to Foam Pad 14.

Figure 3:
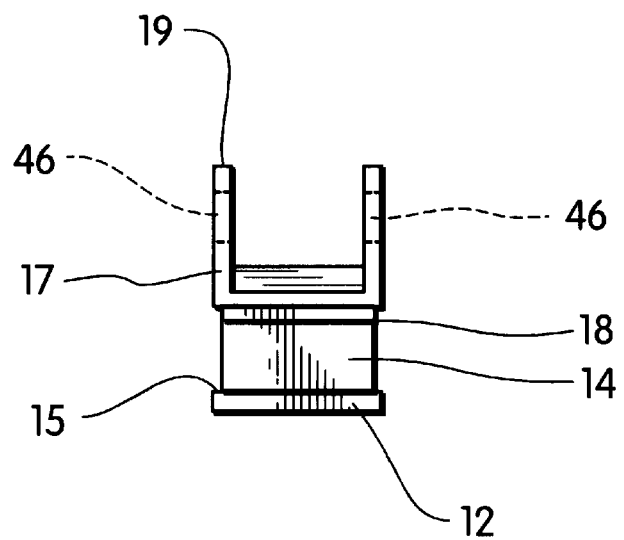
FIG. 3 is a front elevation view of the resistance pad with the resistance material and foam pad attached shown attached to the pad mounting bracket.

FIG. 3 is a front elevation view of Pad Mounting Bracket 17. Resistance Material 12 is along the lower side of Foam Pad 14. This is the surface that makes contact with Flywheel 34. One Pivot Hole 46 is shown in each of the Wings 19. Foam Pad 14 is shown above the lower portion of Resistance Material 12 and below Pad Mounting Bracket 17.

Figure 4A:
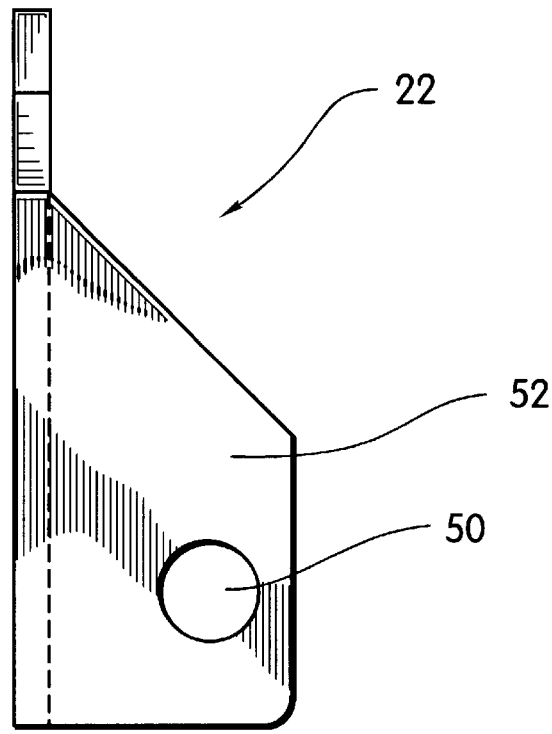
FIG. 4A is a side view of the fulcrum lever mounting bracket.
Figure 4B:
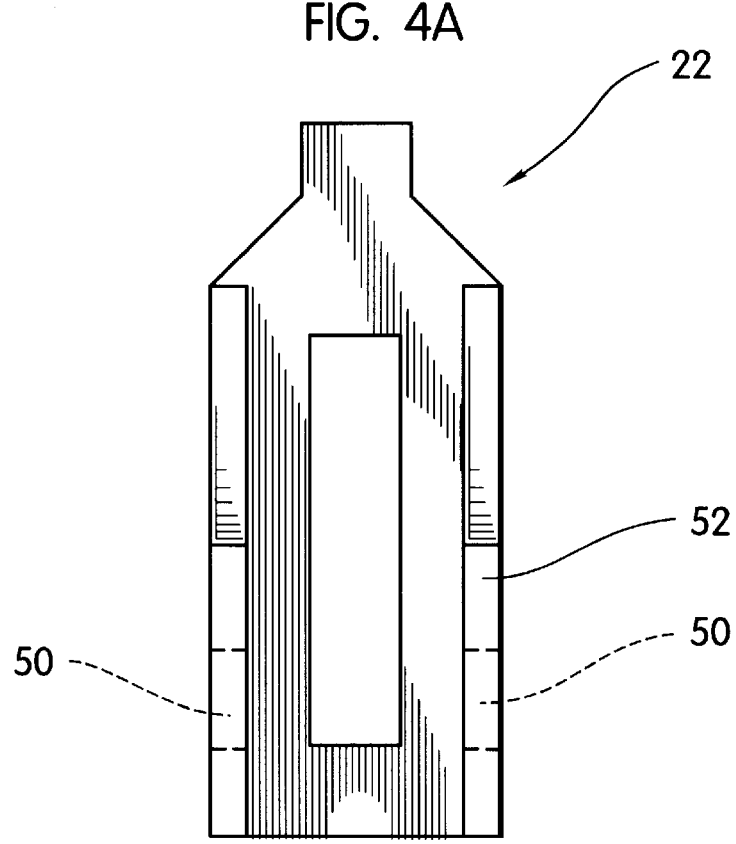
FIG. 4B is a top view of the fulcrum lever mounting bracket.

FIG. 4A and FIG. 4B show Fulcrum Mounting Bracket 22 in a side view and a bottom view. Fulcrum Mounting Bracket Pivot Holes 50 receive Pivot Pin 23 which also passes through Fulcrum Lever Pivot Hole 51 thus rotatabely attaching Fulcrum Lever 21 to Fulcrum Mounting Bracket 22. Pivot Pin 23 may be held in place by using industry standard clips or pins. Thus Fulcrum Lever 21 pivots about Pivot Pin 23 which passes through Fulcrum Lever Pivot Hole 51 and is retained by Fulcrum Mounting Bracket Holes 50 in Mounting Bracket Wings 52 of Fulcrum Mounting Bracket 22.

Figure 5A:
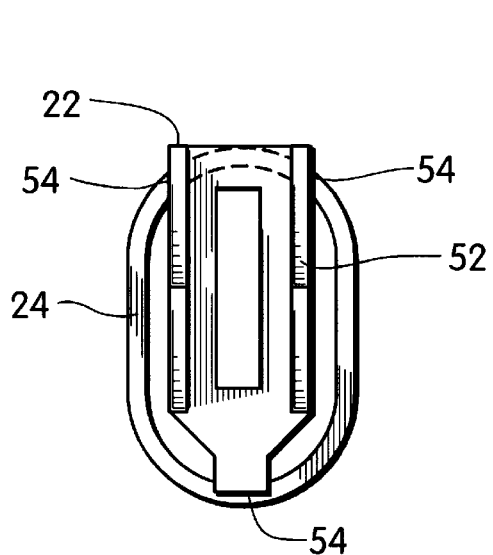
FIG. 5A is a side view of the fulcrum lever mounting bracket attached to the frame tube.
Figure 5B:
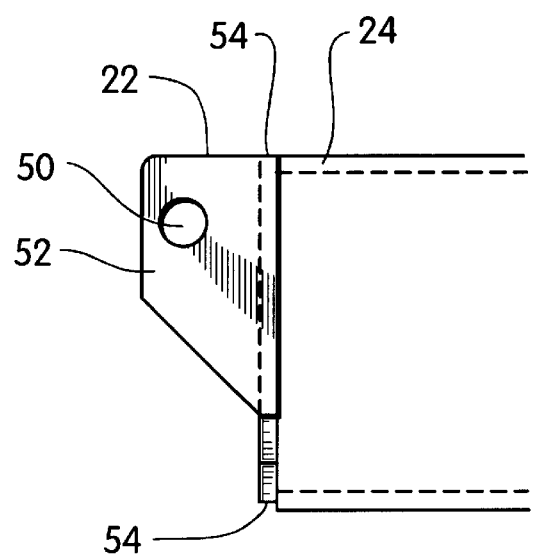
FIG. 5B is a bottom view of the frame tube with the fulcrum lever mounting bracket attached.

FIG. 5A and FIG. 5B show Fulcrum Mounting Bracket 22 in relation to Frame Tube 24. Fulcrum Mounting Bracket 22 is positioned with Mounting Bracket Wings 52 extending downwards and away from Frame Tube 24. Fulcrum Mounting Bracket 22 makes contact with Frame Tube 24 at Weld Points 54. Fulcrum Mounting Bracket 22 is welded by conventional means to Frame Tube 24 at Weld Points 54.

Figure 6:
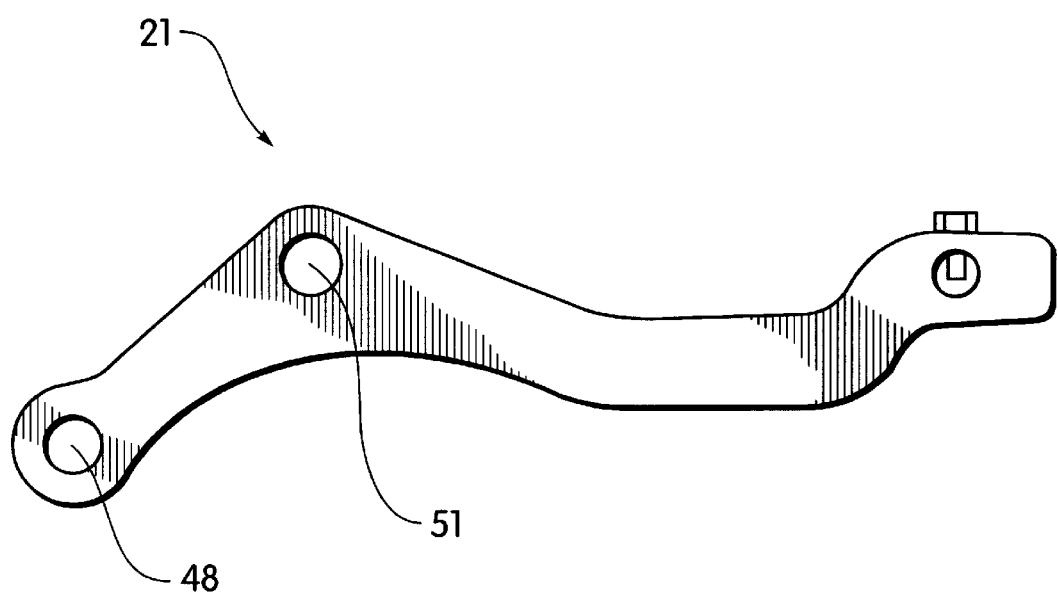
FIG. 6 is a side view of the fulcrum lever.

FIG. 6 shows a side view of Fulcrum Lever 21. Located at the first end of Fulcrum Lever 21 is Pad Mounting Hole 48, which is forms the axis about which the Pad Mounting Bracket 17 rotates. Located approximately one third of the distance in from the first end of Fulcrum Lever 21 is Fulcrum Lever Pivot Hole 51, which forms the axis about which Fulcrum Lever 21 rotates.

Resistance Material 12 is preferably made from Novo 25-NA-FDA Transilon Conveyor Belt Material from Siegling American, Inc. Foam Pad 14 is preferably made from a standard commercially available closed-cell foam material, PORON, manufactured by Rogers Corporation of Rogers, Conn.

The Pad Mounting Bracket 17, Fulcrum Lever 21, Fulcrum Mounting Bracket 22, Frame Tube 24, and Cable Housing Mounting Bracket 30 are custom fabricated using standard manufacturing techniques and materials.

Adhesive layers 15 and 18 are preferably formed using 3M adhesive #968 or 3M VHB adhesive #9505.

What is claimed is:

1. A two stage resistance generating system for exerting resistance to a moving surface comprising:
    at least one resistance pad which exerts a resistance force upon the moving surface when said resistance pad is biased against the moving surface;
    said resistance pad comprising at least one foam pad and at least one piece of resistance material wherein at least one said foam pad is located between at least one said piece of resistance material and said biasing force such that said resistance material makes contact with said moving surface, and
    an actuation means which exerts the biasing force upon said resistance pad causing increased resistance to motion of the moving surface such that the increase in resistance to motion exerted upon the moving surface is exerted in two stages, wherein the ratio of resistance to motion imparted against the moving surface in relation to the amount of biasing force is higher for stage two than for stage one.

2. A two stage resistance generating system as set forth in claim 1 wherein said resistance pad further comprises:
    a pad mounting bracket wherein said foam pad is positioned between the pad mounting bracket and said resistance material.

3. A two stage resistance generating system as set forth in claim 2 wherein said actuation means comprises:
    a fulcrum lever having a first end, a pivot point and a second end wherein said first end is pivotally attached to said pad mounting bracket, said fulcrum lever is pivotally attached via its pivot point such that when said second end is biased away from the moving surface, said fulcrum lever pivots about said pivot point and exerts a biasing force upon said resistance pad which forces said resistance material against the moving surface, imparting an increased resistance to motion to the moving surface.

4. A two stage resistance generating system as set forth in claim 3 wherein said actuation means further comprises:
    a cable means having a first end and a second end; and
    said first end of said cable means is attached to said second end of said fulcrum lever wherein force imparted upon said second end of said cable means is transferred to said second end of said fulcrum lever.

5. A two stage resistance generating system as set forth in claim 4 wherein said actuation means further comprises:
    a cable actuation means attached to said second end of said cable means wherein said cable actuation means comprises an actuation lever and a release lever wherein each rotation of said actuation lever causes a predefined increase in force to said second end of said cable means and said release lever stops all forces from being exerted upon said second end of said cable means.

6. A two stage resistance generating system as set forth in claim 5, wherein the moving surface is curved and said resistance pad is curved in a complementary manner to the moving surface, wherein when said resistance material is in contact with the moving surface a mating interface is formed along the entire length of said resistance material.

7. A two stage resistance generating system as set forth in claim 6 wherein a portion of one end of said resistance pad has less curvature than the remaining portion of said resistance pad such that the mating interface that is formed when said resistance pad is in contact with the moving surface is less then the entire length of said resistance pad.

8. A two stage resistance generating system for an exercise machine for exerting resistance to a moving surface comprising:
    at least one resistance pad which exerts a resistance force upon the moving surface when said resistance pad is biased against the moving surface;

said resistance pad comprising at least one foam pad and at least one piece of resistance material wherein at least one said foam pad is located between at least one said piece of resistance material and said biasing force such that said resistance material makes contact with said moving surface, and an actuation means which exerts the biasing force upon said resistance pad causing increased resistance to motion of the moving surface such that the increase in resistance to motion exerted upon the moving surface is exerted in two stages, wherein the ratio of resistance to motion imparted against the moving surface in relation to the amount of biasing force is higher for stage two than for stage one.

9. A two stage resistance generating system for an exercise machine as set forth in claim 8 wherein said resistance pad further comprises:

a pad mounting bracket wherein said foam pad is positioned between the pad mounting bracket and said resistance material.

10. A two stage resistance generating system for an exercise machine as set forth in claim 9 wherein said actuation means comprises:

a fulcrum lever having a first end, a pivot point and a second end wherein said first end is pivotally attached to said pad mounting bracket, said fulcrum Lever is pivotally attached via its pivot point such that when said second end is biased away from the moving surface, said fulcrum lever pivots about said pivot point and exerts a biasing force upon said resistance pad which forces said resistance material against the moving surface, imparting an increased resistance to motion to the moving surface.

11. A two stage resistance generating system for an exercise machine as set forth in claim 10 wherein said actuation means further comprises:

a cable means having a first end and a second end; and
said first end of said cable means is attached to said second end of said fulcrum lever wherein force imparted upon said second end of said cable means is transferred to said second end of said fulcrum lever.

12. A two stage resistance generating system for an exercise machine as set forth in claim 11 wherein said actuation means further comprises:

a cable actuation means attached to said second end of said cable means wherein said cable actuation means comprises an actuation lever and a release lever wherein each rotation of said actuation lever causes a predefined increase in force to said second end of said cable means and said release lever stops all forces from being exerted upon said second end of said cable means.

13. A two stage resistance generating system for an exercise machine as set forth in claim 5, wherein the moving surface is curved and said resistance pad is curved in a complementary manner to the moving surface, wherein when said resistance material is in contact with the moving surface a mating interface is formed along the entire length of said resistance material.

14. A two stage resistance generating system for an exercise machine as set forth in claim 13 wherein a portion of one end of said resistance pad has less curvature than the remaining portion of said resistance pad such that the mating interface that is formed when said resistance pad is in contact with the moving surface is less then the entire length of said resistance pad.

* * * * *